United States Patent
Ketola

(10) Patent No.: US 10,642,455 B2
(45) Date of Patent: May 5, 2020

(54) USER INTERFACES IN A COMPUTER SYSTEM

(71) Applicant: SSH Communications Security OYJ, Helsinki (FI)

(72) Inventor: Jarkko Ketola, Helsinki (FI)

(73) Assignee: SSH COMMUNICATIONS SECURITY OYJ, Helsinki (FI)

( * ) Notice: Subject to any disclaimer, the term of this patent is extended or adjusted under 35 U.S.C. 154(b) by 557 days.

(21) Appl. No.: 14/980,137

(22) Filed: Dec. 28, 2015

(65) Prior Publication Data

US 2017/0185421 A1    Jun. 29, 2017

(51) Int. Cl.
   G06F 3/0484    (2013.01)
   G06F 3/14      (2006.01)
   G06F 3/048     (2013.01)
   G06F 9/451     (2018.01)

(52) U.S. Cl.
   CPC ............ *G06F 3/0484* (2013.01); *G06F 3/048* (2013.01); *G06F 3/1454* (2013.01); *G06F 3/1462* (2013.01); *G06F 9/451* (2018.02)

(58) Field of Classification Search
   CPC ............................. G06F 9/4443; G06F 3/0484
   See application file for complete search history.

(56) References Cited

U.S. PATENT DOCUMENTS

| | | | |
|---|---|---|---|
| 10,120,854 B2 * | 11/2018 | Campbell | G06Q 10/101 |
| 2002/0054044 A1 * | 5/2002 | Lu | G06F 3/1454 |
| | | | 345/536 |
| 2006/0212810 A1 * | 9/2006 | Segal | G06Q 10/06 |
| | | | 715/234 |
| 2009/0125586 A1 * | 5/2009 | Sato | G06F 3/1454 |
| | | | 709/203 |
| 2012/0017147 A1 * | 1/2012 | Mark | G06F 1/1639 |
| | | | 715/702 |
| 2014/0006967 A1 * | 1/2014 | Arumugam | G06F 9/54 |
| | | | 715/748 |
| 2014/0298361 A1 * | 10/2014 | Cussonneau | H04N 21/25808 |
| | | | 719/328 |
| 2015/0046832 A1 * | 2/2015 | George | G06F 16/958 |
| | | | 715/744 |
| 2015/0293742 A1 * | 10/2015 | Masuda | G06F 3/1454 |
| | | | 345/2.2 |

OTHER PUBLICATIONS

Extended Search Report issued by the European Patent Office in relation to European Patent Application No. 16205711.1-1879 dated Jun. 22, 2017 (12 pages).

* cited by examiner

*Primary Examiner* — Anil K Bhargava
(74) *Attorney, Agent, or Firm* — Robert P. Michal, Esq.; Carter, DeLuca & Farrell LLP

(57) ABSTRACT

The disclosure relates to generation of at least one second instance of a user interface presented by a first device. The first device stores data objects comprising event information associated with user interfaces presented by the first device based on data from a source of data. The first device can generate a user interface based on data from the source of data and at least one of the stored data objects. The at least one data object is communicated from the first device for use by at least one second device in generation of a second instance of the generated user interface by the at least one second device.

27 Claims, 4 Drawing Sheets

USER INTERFACES IN A COMPUTER SYSTEM

FIELD OF THE INVENTION

This disclosure relates to user interfaces in a computer system, and more particularly to generation of at least one further instance of a user interface generated for a device.

BACKGROUND

In the field of computers a user interface can be understood as a feature by means of which a user can interact with a computer apparatus. For example, a user interface can be used for output of content and/or for an input by a user. A computer terminal can comprises a display for presenting graphical user interfaces (UI) for a user. The display can comprise touchscreen features enabling input through the display screen. Input may also be provided by means of a keypad, sensors or the like. Output and/or input can also be based e.g. on audio output/input arrangements, voice recognition and so forth. A user interface can be presented by a terminal device connected to the internet for example based on data fetched from a local memory of the terminal and/or downloaded from a server connected to the internet and providing a web application.

A traditional design paradigm for user interfaces has been prewritten Document Object Model (DOM) structures using HyperText Markup Language (HTML) with extra notation for JavaScript libraries to hook on to attach dynamic behavior. A more recent design paradigm is to have pure functions that read objects data (blueprint) and generate DOM with dynamic behavior based on the object data. The programming paradigm for reactive programming, or asynchronous dataflow programming, is often referred to as Functional reactive programming (FRP). FRP uses the building blocks of functional programming (e.g. map, reduce, filter), and has been used for programming graphical user interfaces (GUIs), robotics, and music, aiming to simplify these problems by explicitly modeling time. An example of such reactive programming techniques for generating graphical user interfaces is known by the name "React".

Reactive programming techniques have been created to enable developers to build large applications with data that changes. When data updates, the user interface is automatically updated to reflect that based on the locally stored data. In reactive UI control information on results of performed functions are stored in a browser cache of the terminal. Information of a particular event is stored in a data object. The data object can then be used to inform the UI control of changes resulting from the functions so that the UI control can then react accordingly. Thus at least a part of the control of what is to be displayed based on data received from a server can be provided locally at the user device based on data objects stored in a browser cache at the user device including information about previous events. This programming technique can be used in generating the "view" part of model-view-controller (MVC) development paradigm.

The recent developments in the field of user interface control, in particular the reactive programming, are gaining popularity in particular in the field of displaying content downloaded from the internet. However, the inventor has recognized that the reactive programming technologies may have not been utilized to their full potential. There may also be certain unresolved issues in some specific applications, for example where there is a wish to generate an instance of a user interface in at least one other device. Thus it is the aim of the current invention to provide new and improved features in generating user interfaces.

It is noted that the herein discussed matters are not limited to any particular type of computerized system but may occur in any system where user interfaces are generated based on reactive programming.

SUMMARY

In accordance with an aspect there is provided a method for generating at least one second instance of a user interface presented by a first device, the method comprising storing by the first device data objects comprising event information associated with user interfaces presented by the first device based on data from a source of data, generating by the first device a user interface based on data from the source of data and at least one stored data object, and sending the at least one data object from the first device for use by at least one second device in generation of a second instance of the generated user interface by the at least one second device.

In accordance with an aspect there is provided a method for generating a second instance of a user interface generated for a first device based on data from a source of data, the method comprising receiving at least one data object generated for the first device comprising event information associated with a user interface generated for the first device, and generating the second instance of the user interface for the second device based on data corresponding to data available for the first device and the at least one data object.

In accordance with another aspect there is provided a method for communication of data in a computerized system, the method comprising receiving data from a first terminal device comprising event information associated with use of content data by the first terminal device, and sending data received from the first terminal device to at least one second terminal device for use by the at least one second terminal device in replicating the use of the content data by the first device.

In accordance with an aspect there is provided a control apparatus for a first device configured to present user interfaces, the control apparatus comprising at least one processor, and at least one memory including computer program code, wherein the at least one memory and the computer program code are configured, with the at least one processor, to cause the first device to store data objects comprising event information associated with user interfaces presented by the first device based on data from a source of data, generate a user interface based on data from the source of data and at least one stored data object, and send the at least one data object for use by at least one second device in generation of a second instance of the generated user interface by the at least one second device.

In accordance with an aspect there is provided a control apparatus for a second device configured to present user interfaces, the control apparatus comprising at least one processor, and at least one memory including computer program code, wherein the at least one memory and the computer program code are configured, with the at least one processor, to cause the second device to receive at least one data object generated for a first device comprising event information associated with a user interface generated for the first device, and generate a second instance of the user interface for presentation by the second device based on data corresponding to data available for the first device and the at least one data object.

In accordance with yet another aspect there is provided a server apparatus for a computerized system, comprising at least one processor, and at least one memory including computer program code, wherein the at least one memory and the computer program code are configured, with the at least one processor, to cause the server apparatus to receive data from a first terminal device comprising event information associated with use of content data by the first terminal device, and send data received from the first terminal device to at least one second terminal device for use by the at least one second terminal device in replicating the use of the content data by the first device.

In accordance with a more detailed aspect data objects are generated and stored for use in user interface generation based on reactive programming.

In accordance with a more detailed aspect a control apparatus for a user terminal device is configured to receive content data via an IP based data network, generate data objects for use in user interface generation based on reactive programming, and communicate data objects comprising event information associated with generated user interfaces with a web socket server.

The at least one data object may be generated for storing in a browser cache of a device.

Information of an event in the at least one data object may be provided with time stamp information such that data corresponding to data available for the first device and information in the at least one data object can be related based on the time stamp information.

The data may comprise image library data.

At least one data object may be communicated in real-time with or retroactively to generation of the at least one data object.

At least one data object may comprise information of at least one of results of functions on JavaScript Object Notation (JSON) data, browsing history, event history, current active state, mouse events, keyboard events, screen position, scroll position, content input in a field, and current view.

The event information can comprise information on changes in user interface display. A further instance of the user interface can be build based on the event information comprising information on changes in user interfaces generated for the first device and the data used as a basis of the presentation.

At least one data object may be communicated to a server apparatus configured to provide screen sharing functionality based on exchange of data objects comprising event information associated with user interfaces or communicating the at least one data object under control of server apparatus configured to provide screen sharing functionality based on exchange of data objects comprising event information associated with user interfaces. The server apparatus may comprise a web-socket server.

Data objects can comprise event information associated with graphical user interfaces. The data objects can be shared with a plurality of devices. A second device that received data objects for generation of the second instance of the user interface generated for the first device in accordance with functional reactive programming can itself send data objects relating to the user interfaces thereof.

Data objects can be analyzed to determine the type of data received from the source of data.

At least one data object can be communicated to and/or from server apparatus configured to provide screen sharing functionality based on exchange of data objects comprising event information associated with user interfaces. A possibility is to communicate the at least one data object under control of server apparatus configured to provide screen sharing functionality based on exchange of data objects comprising event information associated with user interfaces.

Certain more detailed aspects are evident from the detailed description.

In embodiments of the invention event information associated with generation of user interface for a device can be used, with data forming a basis of the user interface, to build a corresponding user interface, or parts thereof, in another device.

SUMMARY OF THE DRAWINGS

Various exemplifying embodiments of the invention are illustrated by the attached drawings. Steps and elements may be reordered, omitted, and combined to form new embodiments, and any step indicated as performed may be caused to be performed by another device or module. In the Figures.

DETAILED DESCRIPTION

Figure 1:
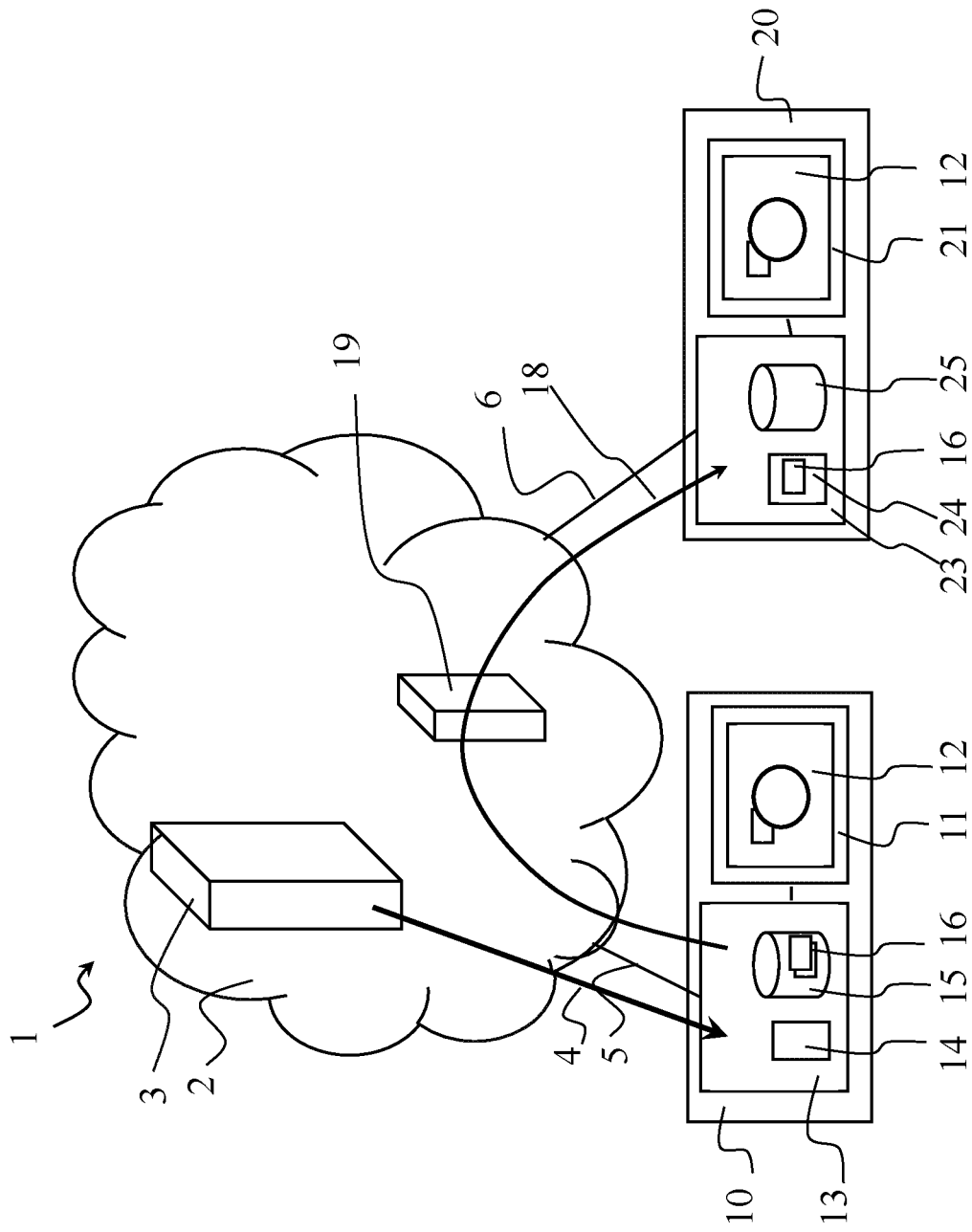
FIG. 1 illustrates an example of a computer system where the invention can be embodied.

FIG. 1 shows an example of a computerized system 1 where the herein described principles may be embodied. The system comprises at least one data network 2, e.g., the Internet and/or at least one Intranet of an organisation. The exemplifying arrangement of FIG. 1 shows user terminal devices 10 and 20 connected to the network 2 via access interfaces 5 and 6, respectively. Server apparatuses 3 and 19 are shown as being provided in the network. It shall be appreciated that although the network is shown as a "cloud" including the servers 2 and 19 (as this is the way the users of devices 10 and 20 see it), in practice the network provides communication channels between the various devices 3, 19, 10 and 20, thus enabling the devices to communicate with each other. Communications within the system 1 can be based on Internet Protocol (IP), e.g. IPv4 (Internet Protocol version 4) or IPv6 (Internet Protocol version 6). Appropriate security protocol(s) can be applied to the communications, should this be deemed necessary. Although not shown for simplicity, various other nodes and apparatus, for example further server, routers, gateway apparatus and/or firewall functions etc. can be provided in the network.

Server apparatus 3 can comprise e.g. a http-server configured to provide data for downloading by devices via the data network 2, the data enabling generation of user interfaces. A logical flow of data from server apparatus 3 to device 10 for use in generation of user interfaces by device 10 is illustrated by arrow 4. Server apparatus 19 may comprise e.g. a web-socket type server configured to provide the devices with a screen-sharing or other user interface sharing functionality.

The user terminal devices 10 and 20 of the example of FIG. 1 comprise respective displays 11 and 21, and control apparatuses 13 and 23. The control apparatuses comprises necessary data processors 14 and 24 and memories 15 and 25 for generating graphical user interfaces 12 for presentation on the displays 11 and 21 in accordance with the herein described principles. In accordance with an example instances of a graphical user interface (GUI) can be generated substantially simultaneously by both devices 10 and 20.

It is also possible to generate at least one second instance of a GUI presented on a display of one of the devices later on by at least one other device.

It is noted that for reasons of clarity of presentation this disclosure uses the noun "display" to refer to a display device configured to present a graphical user interface, for example the display devices 11 and 21 of FIG. 1. Verb "display" refers to the presentation of the GUI on the display. A GUI shall be understood to refer to an instance or view generated and presented, or displayed, on the display based on a specific set of data. The user interface in general can be understood as a time function of a presentation to a user. FIG. 1 shows a GUI 12 as seen on a time instance on display 11, and a second instance of the GUI 12 on display 21, the second instance of the UI being identical with the UI on display 11 at the given time. In the context of this disclosure different views generated based on different data refer to different graphical user interfaces, unless otherwise stated.

It is also noted that only components needed for controlling and generating presentation of graphical user interfaces are shown in FIG. 1 for clarity, and that a typical user terminal device control apparatus can comprise a great number of further components.

Reactive user interface (UI) programming can be used in generating the graphical user interface 12 based on data downloaded from the server 3. Data on results of performed functions can be stored in a browser cache of the control apparatus. The cache can be provided by memory 15 in FIG. 1. The data on the results can be stored in a data object 16. The data object is then used to inform the UI control 14 of changes resulting from the functions, and the UI control can react accordingly to this data when generating the next view, or GUI, for presentation display 12 in accordance with the principles of reactive (functional) programming. Thus at least a part of the control of what is displayed based on data 4 received from the server 3 is provided locally at the terminal device 10 based on data objects including information about previous events and stored in the browser cache.

Reactive functional programming (RFP) is one example of reactive user interface generations technologies. RFP can operate based on use of JavaScripts. RFP is sometimes called a JavaScript library for building user interfaces. A JavaScript library is generally understood as a library of pre-written JavaScript which allows for easier development of JavaScript-based applications, especially for AJAX (short for asynchronous JavaScript and XML) and other web-centric technologies. In general, UI technology is currently moving to the direction of reactive programming that is based on functions on JSON data. JSON (sometimes called JavaScript Object Notation), is an open standard format using human-readable text to transmit data objects consisting of attribute-value pairs. The data format has been used for asynchronous browser/server communication (AJAJ), to replace XML.

The graphical user interface (GUI) 12 to be presented on the display 11 of terminal device 10 can be generated by control apparatus 13 based on JSON data received from the server 3 and functions that react to data in the objects and the received data. In particular, Document Object Models (DOMs) can be generated by the control apparatus 13 based on this data. The Document Object Model (DOM) is a cross-platform and language-independent convention for representing and interacting with objects in HTML, XHTML, and XML documents. The nodes of every document are organized in a tree structure, called the DOM tree. Objects in the DOM tree may be addressed and manipulated by using methods on the objects. The public interface of a DOM is specified in its application programming interface (API).

The functions reading the object data (blueprint) and generate DOMs with dynamic behavior based on the object data. Each result of a created DOM is stored in the cache memory of the browser. In FIG. 1 this is illustrated by objects 16 stored in the memory 15 of the control apparatus 13. An event emitter can then inform the UI control 14 of the changes, and the control 14 can react to these results and generate user interfaces on the display 11 accordingly. Each individual event will leave information thereof with a timestamp into the object 16. Thus the browsing history, event history, current active state and other possible information relating to generation of user interfaces is available in object format in the browser cache.

In accordance with one aspect of the invention, information of a graphical user interface of a terminal device is shared with at least other terminal device. The sharing of the graphical user interface information can be provided by transferring at least one data object containing event information to the at least one other terminal device. The event information can be understood to be descriptive of the state of the user interface at a given moment of time. A recipient device can use the event information and data underlying the presentation to create a second instance of the user interface at the given moment of time.

Server apparatus 19 can be provided for handling communications in relation to such transfer of objects between the devices. The operation can be arranged in relation to use of a web application provided by the server apparatus 3. More detailed examples of such operation is given later in this description.

In FIG. 1 transfer of a data object 16 from the control apparatus 13 of a first device 10 to the control apparatus 23 of a second device 20 is illustrated by line 18. It is noted that line 18 illustrates logical transfer of the data objects from device 10 to device 20. The physical transfer of the data objects may occur via the server 19 controlling screen sharing/providing a screen sharing application. Alternatively, direct client-to-client or point-to-point connections between the devices (e.g. via Bluetooth™ or other short range connections, via one or more data networks between the devices). One or more gateways, firewalls etc. may be provided on the route between the devices. Thus, although in FIG. 1 the server apparatus 19 is shown to be on the communications route 18, the communications between the devices can also be direct, and only controlled by the server apparatus 19.

Data objects can be sent from the cache of the first device. The data objects can also be sent straight away when generated before or at the same time with storing in the cache. When received at the second terminal, the data objects can be stored in the cache first, or used directly in generation of further instances of the user interfaces presented by the first device, depending on the application.

Figure 2:
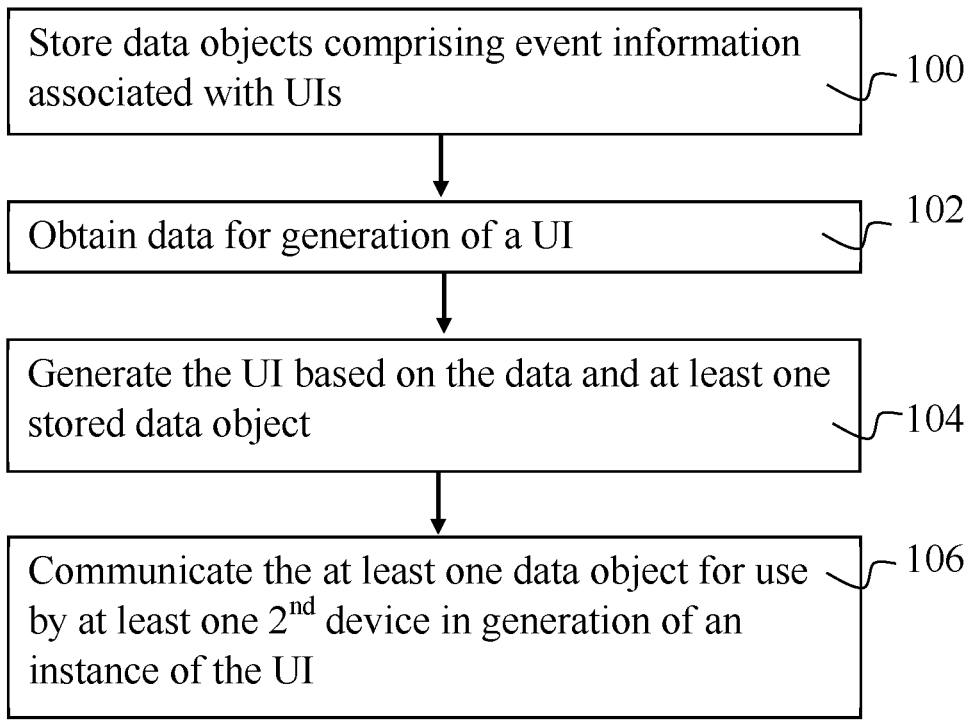
FIGS. 2, 3 and 4 show flowcharts for operation in various entities in accordance with certain embodiments.

FIG. 2 shows a flowchart in accordance with an example where at least one second instance of a user interface generated for a first device is generated. The first device stores at 100 data objects comprising event information associated with user interfaces generated for the first device. Data for use in generation of user interfaces can be obtained at 102 by the first device e.g., by receiving data from a source of content data serving the first device. At least a part of the data may be provided otherwise. A user interface is generated at 104 based on the data and at least one stored data object. The generation can be based on the principles of reactive programming.

In addition to use of the at least one data object for generation of a user interface for the first device, the at least one object is made available for at least one second device for generation of a second instance of the user interface. The at least one data object is communicated at 106 from the first device to be made available for the at least one second device. The communication can be either direct or via one or more intermediate devices, for use in generation of a further instance of the user interface at the at least one second device.

Figure 3:
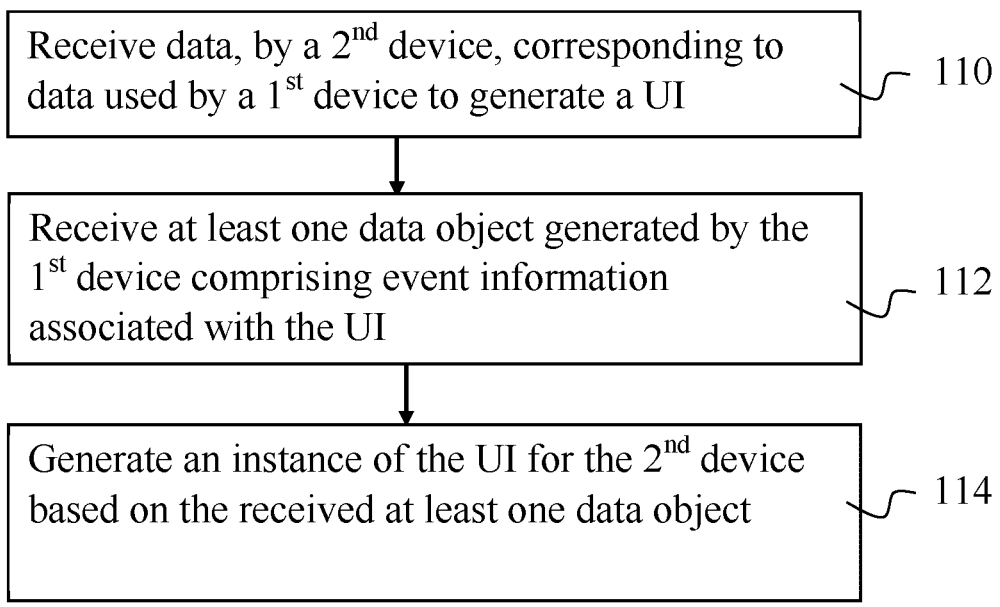

FIG. 3 shows a flowchart in accordance with an example where a second device utilizes information in a data object created for the first device in generating a further instance of a user interface generated by the first device. At 110 data is received by the second device, the data comprising at least one data object having been generated for the first device. The at least one data object comprises event information associated with user interface generation for the first device. A further instance of the user interface can then be generated at 114 by the second device based on the at least one data object.

Figure 4:
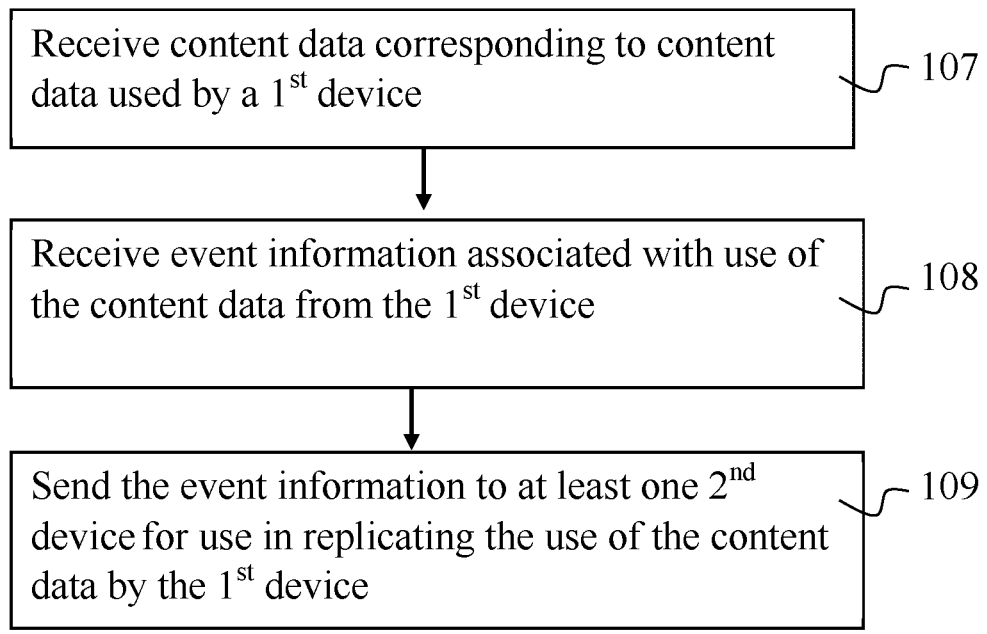

FIG. 4 is a flowchart for delivering data in a computerized system according to another aspect, illustrating operation in an apparatus configured to receive event information from at least one terminal device and distribute the event information to at least one other device. The event information can associate with content data downloaded from a server, the apparatus being further configured to deliver also the content data to the at least one other terminal device. In FIG. 1 example the apparatus would be provided by the server apparatus 19. The server apparatus 19 can comprise e.g. a web socket server.

In the method content data is received at 107. The content data corresponds to data received by the first terminal device from a server via a computer network. The content data may be received from a first terminal device. A copy of content data received from the server may be communicated by the first terminal device via the same computer network. Event information associated with use of the content data by the first terminal device is received at 108.

The server providing the content data may comprise e.g. a http server. The content data may comprise templates for functional reactive programming. In accordance with a possibility the first device delivers the event information by means of data objects created for use by functional reactive programming module of the first device.

The content data and the event information may be communicated separately or substantially at the same time, even in the same messaging instance. In the example the content data forming the basis of a graphical user interface or another presentation by the second terminal device is received first, and the event information can then be received later as events occur at the first device, and/or periodically. Content data and event information can be associated e.g. by means of time stamps or similar indicators.

The data received from the first device is then communicated at 109 to at least one second device for use by the at least one second terminal device in replicating the use of the content data by the first device. An example of such use is generation of replica instances of graphical user interfaces as shown by the flowchart of FIG. 3. The content data and the event information can be communicated substantially at the same time, even by same messaged, or in separate times and messages.

In this aspect content data such as templates originating from a content server, for example a web application server, can be distributed via a terminal device and separate sharing server. This can be beneficial e.g. in maintaining synchronization in use of the content data, e.g. in presenting view based on the data. If any of the first terminal devices makes a change to the screen, this event information is distributed via the sharing server to other devices connected thereto, and the actual presentations can be generated accordingly. This can be especially beneficial in keeping large data downloads in synchronization.

Distribution of data downloaded by a terminal device via a sharing server can also be beneficial in occasions where the content server could become overloaded if contacted directly by all users willing to download the content data. In this scenario one user can download the content and stream it to other users via the sharing server. According to a possibility, in a sharing group, anyone wanting to download certain content enquiries first if anyone in the group has already downloaded it, and if so, downloads the content via the sharing server rather than directly from the content server. If not, then the content is downloaded from the content server and the sharing server is notified of the event.

The following discusses a more detailed example of screen-sharing in accordance with an aspect of the herein described principles. A user of a device can navigate to a website company.com provided by a server. The server providing the website company.com can comprise a http server or the like. In response to opening the webpage the server returns an application to the device. The application can comprise a single JavaScript file on an empty page. Upon receipt of the file the device is provided with the basic data for generating a first graphical user interface based on data from the website company.com.

Once running on the device, the application can check whether the user is an authenticated user. If not, the application can contact an appropriate resource, e.g. address company.com/login. In response, the server returns a JavaScript Object Notation (JSON) object describing a login view. The application at the device receives the JSON data, reads through the data, parses the data, and plants the data to a local user interface object (called "blueprint"). The blueprint can emit an event to the application, and the application can respond to the change by repainting the view displayed for the user. The user can now sign in using the given template presented on the display of the device. If successful, the application runs a main module thereof with given credentials of the user, enabling use of the website company.com. During the use successive graphical user interfaces are generated, whenever the view is repainted.

In case screen sharing is desired, the main module of the application running in the device can establish a persistent connection to a server providing a screen sharing functionality. The application running on the device can e.g. use a websocket protocol by means of which every change in the blueprint object is broadcast. For example, events such as mouse events, keyboard events, screen position, scroll position, current view, etc. of a user (this can be some or all related users), can be reported to the screen sharing server.

Upon receipt the server can store the event information into a database thereof for later use and/or distribute the event information immediately. The storing can comprise a timestamp associated with an event. This enables replay of the user's session at a given date/time.

Figure 5:
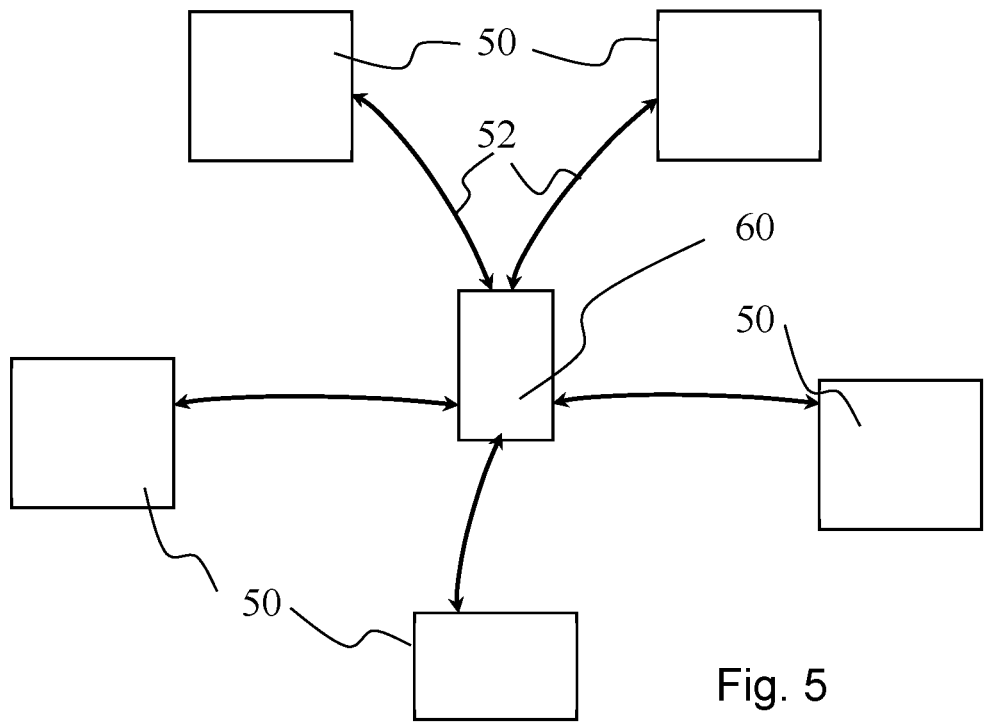
FIG. 5 shows an example of group user interface sharing operation.

FIG. 5 illustrates sharing of event information between multiple users 50. A user can set the application state to being shared with another user, or a group of users. The sharing server 60 can respond by requesting the other user(s) to approve the request. Upon acceptance the server can place the users into a shared channel. Sharing of event information in data objects can take place between all participants 50 of the sharing sessions, this being illustrated by the double headed arrows 52. Everyone in the group can see a user interface that is based on changes by everyone in the group. Thus each user can create view and these views are distributed to everyone else. In the other extreme, only one of the users receives the data objects from other users and can see the user interfaces of the other users, e.g. as a birds view or per selection. Such user can be e.g. an administrator or a security monitor.

A user or users can broadcast input events and user interface changes on the shared channel back and forth. This can be used to generate a sync state between the clients i.e. member devices of the group. The sync state can be perfect or imperfect depending on desired functionality. For example, the quality of the sync operation can depend whether the operation is parallel or collaborative, whether a party is being controlled or controlling, and so on.

Once a server based screen sharing has been set up, applications using the screen sharing can be pretty immense. The application can transcend from just basic GUI sharing features (e.g. visual playback features) to collaborative features (e.g. team working). Such collaborative features are currently not available even in native applications.

The data objects can be exchanged between the devices substantially in real time. According to another possibility the data objects are transferred retroactively. The latter can take place e.g. periodically and/or in response to a predefined event, such as a request for the even information object, change in the state of the recipient user, or a change in the display of the user interface.

Thus, instead of just generating and storing the data objects for use in reactive user interface generation by the first device, the data objects can be shared with at least one other device.

Information of timing of an event for use in relating the even in the object with the received data can be provided by providing the at least one data object with a timestamp. The at least one data object may comprise information of at least one of browsing history of the first device, event history of the first device, and current active state of the first device. The event information may also comprise information on changes between user interface displays.

The data forming the basis of the presentations may comprise image library data, for example JSON data.

A second device may receive data objects associated with a plurality of first devices, and generate simultaneously further instances of user interfaces originally presented by the plurality of first devices. Such feature can be useful e.g. in monitoring applications where an administrator needs to monitor user interfaces of a plurality of users simultaneously. For example, a "birds view" of all, or more than one, monitored user interfaces can be generated substantially in real-time based on the data objects. This is possible because the amount of events is typically not especially high, even in large organizations, and the size of each data object is relatively small.

It is also possible to provide a time machine of a session of a user. A video playback type presentation can be generated based on the event history in the data objects from the terminal device of a user of interest. Instead of a video playback, the user interface control of the device that received the data objects can replay the session event history of the user of interest.

Exchange of the event information data objects also enables features like collaboration, customer support and so on. For example, a team of people may be working on the same project. A socket server can distribute the necessary data to client devices which are configured to exchange event information data objects associated with the data. Data objects containing information of a change in the view by a user can be broadcast via the server to other users and thus the entire team can see a synchronized presentation of the view substantially in real time.

According to a possible use scenario a user interface for authorizing an action is distributed to a group of users. The user interface displays a field for a password, e.g. a string of characters. Each user can have a user specific string of characters input of which is needed for the action to be authorized. Input data strings are communicated by the user devices to the sharing server in data objects as described above. The strings and characters thereof can be required to be input in a specific order only known by the sharing server. The sharing server can randomize the order in which the strings needs to be input such that it is not possible for outsiders to compile the correct order. The sharing server controls presentation of the user interfaces and timing of inputs. The action is authorized only if the inputs are in correct, in correct order and correctly timed so that the server can compile a correct long string. Such arrangement can be beneficial e.g. in authorizing financial or military actions.

The embodiment have broad applicability in various other web applications, and is not limited to security, monitoring or work distribution related solutions only. For example, a screen sharing application can be provided where a tutor/supervisor can take control on the screen of the user asking for advice. Another example is a testing site or a demo site where anyone can access and use a website. An administrator can monitor, based on the data objects, in real-time what actions the users have been taking and how the website responds to various actions by the users. Usage and/or marketing analysis can be provided e.g. based on large multiscreen display views presented substantially in real-time showing which application, programs and features thereof are currently used and how.

The data objects from the first device to determine the type of data received for the source of data. For example, analyzing the rate of events based on information available in the data objects it is possible to determine whether the data is from a human user or a bot.

Figure 6:
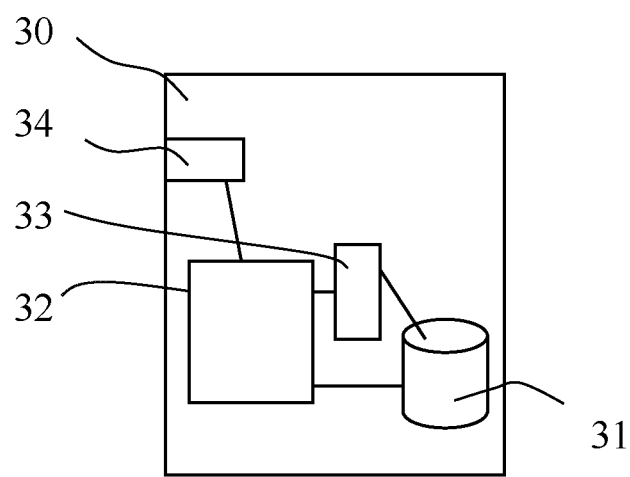
FIG. 6 shows data processing apparatus.

FIG. 6 shows an example of control apparatus for a device capable of processing the above described functionalities in terminal devices associated with the screen sharing and/or in the server apparatus controlling the screen sharing functionality. Such a control apparatus 30 can be for example integrated with, coupled to and/or otherwise controlling the respective displays 11 and 21 and/or the server apparatus 19 of FIG. 1. For this purpose the control apparatus comprises at least one memory 31, at least one data processing unit 32, 33 and an input/output interface 34. Via the interface the control apparatus can be coupled to the network access interface and/or the display of the respective device. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

According to an embodiment there is provided a computer program comprising code means adapted to perform, when the program is run on processor apparatus configured for controlling a first device, a method for enabling generation of at least one second instance of a user interface presented by a first device. The method comprises storing objects comprising event information associated with user interfaces presented by the first device based on data received from a source of data, generating by the first device a user interface based on the received data and at least one stored data object, and sending the at least one data object from the first device for use by at least one second device in generation of a second instance of the user interface by the at least one second device.

According to an embodiment there is provided a computer program comprising code means adapted to perform, when the program is run on processor apparatus for controlling operation of the second device, a method for generating the second instance of the user interface generated for the first device. The method comprises receiving at least one data object from the first device, the at least one data object comprising event information associated with a user interface generated for the first device, and generating the second instance of the user interface for the second device based on data corresponding to data available for the first device and the at least one data object.

According to an embodiment there is provided a computer program comprising code means adapted to perform, when the program is run on processor apparatus for controlling operation of a server apparatus, for example a web-socket server, a method for communication of data in a computerized system. The method comprises receiving data from a first terminal device comprising event information associated with use of content data by the first terminal device, and sending data received from the first terminal device to at least one second terminal device for use by the at least one second terminal device in replicating the use of the content data by the first device.

A computer program based on any of the above examples can be further adapted to perform any of the additional aspects disclosed herein.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. For example, the steps of the flowcharts do not need to be performed in the shows order, and/or can occur at least in part in parallel. All such and similar modifications of the teachings of this invention will still fall within the spirit and scope of this invention.

I claim:

1. A method for generating at least one second instance of a user interface presented by a first device, the method comprising:
   generating by the first device at least one data object comprising event information associated with user interfaces generated by the first device based on data from a source of data, the event information comprising information for a user interface control function on changes resulting from functions performed by a user of the first device on a user interface generated based on the data from the source of data,
   generating by the first device a user interface based on the data from the source of data and the functions performed by the user of the first device, and
   sending the generated at least one data object from the first device for use by at least one second device, the generated at least one data object configured to enable a user interface control function of the at least one second device to generate a separate second instance of the user interface by replicating the changes resulting from the functions performed by the user of the first device on the data from the source of data by the at least one second device on the separate second instance of the user interface.

2. The method according to claim 1, comprising generating and storing of the at least one data object for use in user interface generation based on reactive programming by the first device.

3. The method according to claim 1, comprising generating the at least one data object for storing in a browser cache of the first device.

4. The method according to claim 1, comprising providing information of an event in the at least one data object with a time stamp.

5. The method according to claim 1, wherein the data from the source of data comprises image library data.

6. The method according to claim 1, comprising sending the at least one data object in real-time with or retroactively to generation of the at least one data object.

7. The method according to claim 1, wherein the at least one data object comprises information of at least one of results of functions on JavaScript Object Notation (JSON) data, browsing history, event history, current active state, mouse events, keyboard events, screen position, scroll position, content input in a field, and current view.

8. The method according to claim 1, wherein the event information comprises information on changes in user interface resulting from functions performed by the user through at least one of a mouse, a keyboard, a screen, or a scroll on the data from the source of data.

9. The method according to claim 1, comprising communicating the at least one data object to a server apparatus configured to provide user interface replicating functionality based on exchange of data objects comprising information on changes resulting from the functions performed by the user on the data from the source of data.

10. The method according to claim 9, wherein the server apparatus comprises a web-socket server.

11. The method according to claim 1, comprising sharing data objects comprising event information associated with graphical user interfaces with a plurality of devices.

12. A method for generating a separate second instance of a user interface generated for a first device based on data from a source of data, the method comprising:
receiving by a second device at least one data object generated for a user interface control function by the first device and comprising event information associated with a user interface generated for the first device, the event information comprising information on changes resulting from functions performed by a user of the first device on a user interface generated at the first device based on the data from the source of data, and
generating by the second device the separate second instance of the user interface for presentation by the second device based on data corresponding to data available for the first device and the at least one data object comprising the information on changes resulting from the functions performed at the first device on the data from the source of data, the generating comprising replicating by a user interface control function of the second device the changes resulting from the functions performed by the user of the first device on the data from the source of data on the separate second instance of the user interface.

13. The method according to claim 12, comprising using by the second device the received data objects for generation of the second instance of the user interface generated for the first device in accordance with functional reactive programming.

14. The method according to claim 12, comprising relating said data corresponding to data available for the first device and information in the at least one data object based on time stamp information included in the at least one data object.

15. The method according to claim 12, wherein the at least one data object associated with the first device comprises information of at least one of results of functions on JavaScript Object Notation (JSON) data browsing history, event history, current active state, mouse events, keyboard events, screen position, scroll position, content input in a field, and current view.

16. The method according to claim 12, wherein the event information comprises information on changes in user interfaces generated for the first device resulting from functions performed by the user through at least one of a mouse, a keyboard, a screen, or a scroll at the first device on the data from the source of data.

17. The method according to claim 12, comprising exchanging data objects comprising event information associated with user interfaces with a plurality of devices.

18. The method according to claim 12, comprising analysing data objects from the first device to determine the type of data received from the source of data.

19. The method according to claim 12, comprising receiving the at least one data object from a server apparatus configured to provide user interface replicating functionality based on exchange of data objects comprising information on changes resulting from the functions performed by the user of the first device on the data from the source of data.

20. A method for sharing of data in a computerized system, the method comprising:
receiving data from a first terminal device comprising event information associated with a user interface generated for the first terminal device based on content data, the event information comprising information generated for a user interface control function on changes resulting from functions performed by a user of the first terminal device on a user interface generated based on the content data, and
sending the data received from the first terminal device to at least one second terminal device for use by the at least one second terminal device in generation of a separate second instance of a user interface generated for the first terminal device, the data configured to enable a user interface control function of the at least one second terminal device to replicate the changes resulting from the functions performed on the content data at the first terminal device on the separate second instance of the user interface based on said information on the changes resulting from the functions performed by the user of the first terminal device on the content data.

21. A control apparatus for a first device configured to present user interfaces, the control apparatus comprising at least one processor, and at least one memory including computer program code, wherein the at least one memory and the computer program code are configured, with the at least one processor, to cause the first device to
generate at least one data object comprising event information associated with user interfaces generated by the first device based on data from a source of data, wherein the event information comprises information for a user interface control function on changes resulting from functions performed by a user of the first device on a user interface generated based on the data from the source of data,
generate a user interface based on data from the source of data and the functions performed by the user of the first device, and
send the generated at least one data object for use by at least one second device, the generated at least one data object configured to enable a user interface control function of the at least one second device to generate a separate second instance of the user interface by the at least one second device by replicating the changes resulting from the functions performed by the user of the first device on the data from the source of data on the separate second instance of the user interface.

22. The control apparatus according to claim 21, wherein the first device comprises a user terminal configured to receive content data from a server via an IP based data network, generate the data objects for use in user interface generation based on reactive programming, and communicate data objects comprising event information associated with generated user interfaces with a web socket server.

23. A control apparatus for a second device configured to present user interfaces, the control apparatus comprising at least one processor, and at least one memory including computer program code, wherein the at least one memory and the computer program code are configured, with the at least one processor, to cause the second device to receive at least one data object generated for a user interface control function by a first device and comprising event information associated with a user interface generated for the first device, wherein the event information comprises information on changes resulting from functions performed by a user of the first device on a user interface generated at the first device based on the data from the source of data, and generate a separate second instance of the user interface for presentation by the second device based on data corresponding to data available for the first device and the at least one data object comprising the information on results of the functions performed at the first device on the data from the source of data by replicating by a user interface control function of the second device the changes resulting from the functions performed by the user of the first device on the data from the source of data by the at least one second device on the separate second instance of the user interface.

24. The control apparatus according to claim 23, wherein the second device comprises a user terminal configured to receive content data from a server via an IP based data network, interpret the received data objects for use in user interface generation based on reactive programming, and communicate data objects comprising event information associated with generated user interfaces with a web socket server.

25. A server apparatus configured for sharing of data in a computerised system, comprising at least one processor, and at least one memory including computer program code, wherein the at least one memory and the computer program code are configured, with the at least one processor, to cause the server apparatus to receive data from a first terminal device comprising event information associated with use of content data by the first terminal device, wherein the event information has been generated for a user interface control function and comprises information on changes resulting from functions performed by a user of the first terminal device on a user interface generated at the first terminal device based on the content data, and send data generated for the user interface control function and received from the first terminal device to at least one second terminal device for use by a user interface control function of the at least one second terminal device in user interface generation, the data configured to enable the at least one second terminal device to replicate the changes resulting from the functions performed on the content data at the first terminal device based on said information on the changes resulting from the functions performed by the user of the first terminal device on the content data on a separate second instance of the user interface generated at the first terminal device.

26. The server apparatus according to claim 25, configured to control communication of at least one data object from one of the second terminal devices to at least one other terminal device, the at least one data object comprising event information associated with user interface generation by the second terminal device based on data received from a source of data, for use in generation of a further instance of the user interface based on information on results of functions performed at the second terminal device on the data received from a source of data.

27. The server apparatus according to claim 25, comprising a web-socket server.

* * * * *